United States Patent
Mancuso et al.

(10) Patent No.: US 6,748,105 B1
(45) Date of Patent: Jun. 8, 2004

(54) METHOD AND SYSTEM FOR CREATING ANAGLYPHS

(75) Inventors: Massimo Mancuso, Monza (IT); Emmanuel Lusinchi, San Diego, CA (US)

(73) Assignee: STMicroelectronics, Inc., Carrollton, TX (US)

(*) Notice: Subject to any disclaimer, the term of this patent is extended or adjusted under 35 U.S.C. 154(b) by 627 days.

(21) Appl. No.: 09/583,292

(22) Filed: May 31, 2000

(51) Int. Cl.[7] .................. G06K 9/00; G03B 35/00
(52) U.S. Cl. ............... 382/154; 382/162; 396/326
(58) Field of Search .................. 382/154, 162; 348/42, 54, 60, 222.1, 43–53, 55–59; 345/419; 396/326, 324, 327

(56) References Cited

U.S. PATENT DOCUMENTS

| | | | |
|---|---|---|---|
| 5,570,150 A | 10/1996 | Yoneyama et al. | 396/324 |
| 5,715,489 A | 2/1998 | Inaba | 396/327 |
| 5,820,545 A * | 10/1998 | Arbter et al. | 600/117 |
| 5,895,130 A * | 4/1999 | Saito et al. | 396/326 |
| 6,037,971 A * | 3/2000 | McLaine et al. | 348/47 |
| 6,256,414 B1 * | 7/2001 | Mancuso et al. | 382/232 |
| 6,389,236 B1 * | 5/2002 | Western | 396/324 |
| 6,489,962 B1 * | 12/2002 | Ambroziak et al. | 345/427 |

OTHER PUBLICATIONS

AI Effect, Inc., Stereoscopic Imaging, http://www.aifx.com/3d_home.html.

* cited by examiner

Primary Examiner—Mehrdad Dastouri
Assistant Examiner—Virginia Kibler
(74) Attorney, Agent, or Firm—Steven Bongini; Lisa K. Jorgenson

(57) ABSTRACT

A method in digital stereo camera for creating anaglyphs of a given subject with a pre-set stereoscopic distance ($S_d$). The camera has a pre-set distance (D) between and an scene plane and a lens plane defined by pair of first and second lenses aligned along a plane. The camera includes a pre-set distance (p) between the lens plane and an image plane. The pair of lenses is coupled to a pair of imagers. The method comprising the steps of: producing a pair of stereo images each having three color channels; cropping each of the pair of images by an amount (b), where $b=S_d*(p/D)$; and combining one color channel from one of the pair of stereo images with two color channels from a second of the pair of stereo images, so that the resulting image comprises three orthogonal color channels. In another embodiment, a digital stereoscopic camera and a computer readable medium for carrying out the above method is described.

18 Claims, 7 Drawing Sheets

AST Catania Lab.

FIG. 4    400

METHOD AND SYSTEM FOR CREATING ANAGLYPHS

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS REFERENCE TO RELATED APPLICATIONS

Not Applicable

FIELD OF THE INVENTION

This invention relates to the production and display of still and motion pictures and more particularly to an improved method and apparatus for producing stereoscopic images, especially analglyphs.

BACKGROUND OF THE INVENTION

Both still and motion pictures use techniques to improve realism, or three-dimensional, cinematography. "3-D" films use two cameras or one camera with two lenses. The centers of the lenses are spaced 2 ½ inches to 2 ¾ inches apart (60 millimeters–70 millimeters) to replicate the displacement between a viewer's left and right eye. Each lens records a slightly different view corresponding to the different view each eye sees in normal vision.

Stereo photographic systems have been around for a long time. Stereographic cameras use two distinct optical systems for photographing two separate images of the same subject viewed from different points and formed onto one picture frame next to each other. One such system is disclosed in U.S. Pat. No. 5,570,150 entitled "Stereo Photographing System" with inventors Yoneyama et al. issued on Oct. 29, 1996.

Despite many efforts to create "3-D without glasses" (notably in the U.S.S.R., where a screen of vertical slats was used for many years), audience members have had to wear one of two types of special glasses to watch 3-D films. In the early anaglyph system, one lens of the glasses was red and the other green, which was later, switched to blue. The picture on the screen viewed without glasses appeared as two slightly displaced images, one with red lines, the other with green. Each lens of the glasses darkened its opposite color so that each eye would see only the image intended for it. Anaglyphs have the advantage of being inexpensive and easily adapted to many media. Unfortunately, color rendition inevitably suffers, and commonly must be sacrificed. More information regarding anaglyphs can be found from online URL (http://www.britannica.com).

The use of film based cameras are beginning to be replaced by digital cameras that unlike their film-based counterparts, store images captured in memory into digital memory such as flash memory.

One of the problems with the use of known stereoscopic film based techniques is how to handle "overlap region" between a left-hand image and a right-hand image for anaglyphs. Stated differently, given a left image and a right image of the same scene:

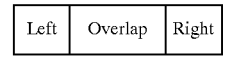

The outer areas on the left-hand side and the right-hand side contain information only from the single source, i.e., the left-hand source or the right-hand source. In contrast, the overlap area contains information from both the left-hand source and-the right-hand source.

Computer based techniques exist for creating anaglyphs from two images, such as those available from the company A I Effects Inc. at online URL (http://www.aifx.com/3d_home.html). However, these techniques are dependent on the use of a computer with images converted into digital format.

Accordingly, a need exists for a portal stereoscopic digital camera to handle the generation of anaglyph images from two sources to correctly handle the overlap region without the need for an expensive computer.

SUMMARY OF THE INVENTION

Briefly, according to the present invention, described is a method in digital stereo camera for creating anaglyphs of a given subject with a pre-set stereoscopic distance ($S_d$). The camera has a pre-set distance (D) between and an scene plane and a lens plane defined by pair of first and second lenses aligned along a plane. The camera includes a pre-set distance (p) between the lens plane and an image plane. The pair of lenses is coupled to a pair of imagers. The method comprising the steps of: producing a pair of stereo images each having three color channels; cropping each of the pair of images by an amount (b), where $b=S_d*(p/D)$; and combining one color channel from one of the pair of stereo images with two color channels from a second of the pair of stereo images, so that the resulting image comprises three orthogonal color channels.

In another embodiment, a digital stereoscopic camera and a computer readable medium for carrying out the above method is described.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Glossary of Terms Used in this Disclosure

- Anaglyph—a stereogram in which the two views are printed or projected in a superimposed manner using complementary colors usually blue and red: by viewing through filer spectacles of corresponding complementary colors, a stereoscopic image is formed.
- Stereoscopy—the phenomenon of simultaneous vision with two eyes in which there is a vivid perception of the distances of objects from the viewer; it is present because the two eyes view objects in space from two points so that the retinal image patterns of the same object are slightly different in the two eyes.
- Stereogram—a stereoscopic set of images correctly oriented and mounted for stereoscopic viewing.
- Stereoscopic digital camera—a film-less camera which takes two images simultaneously with two similar optical sensors a few inches apart, for use in a stereoscopic or other optical system which gives a sensation of depth to the viewer.

Exemplary Embodiment of Stereoscopic Camera

Figure 1:
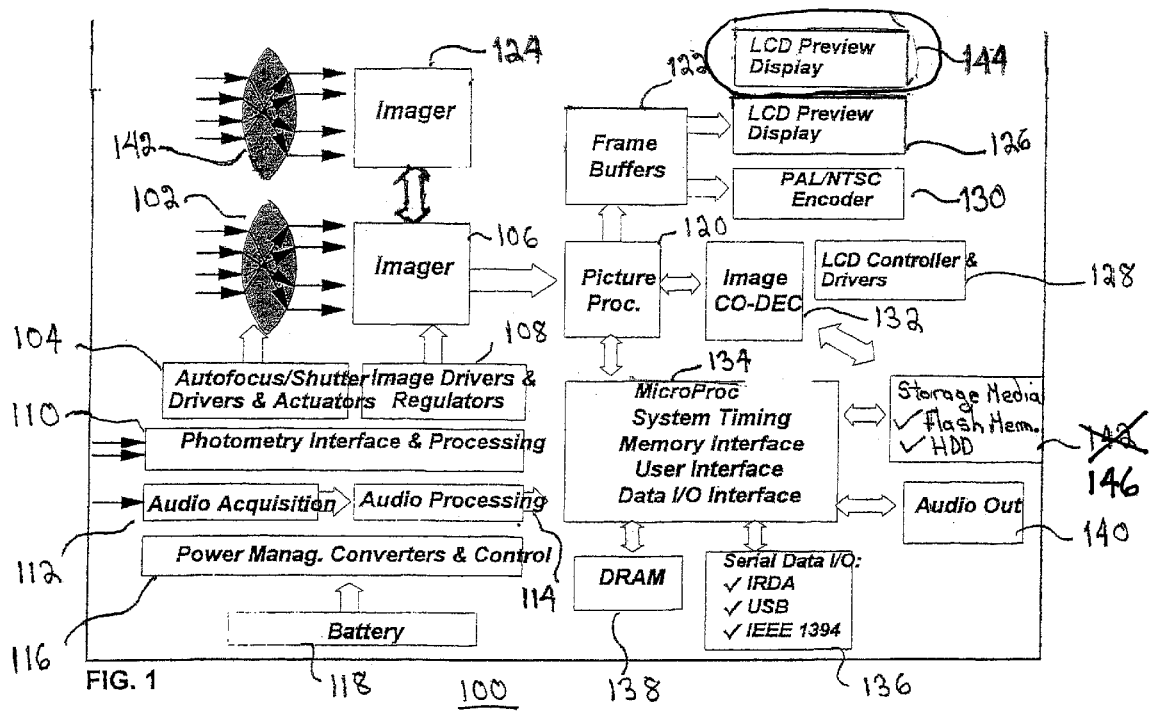
FIG. 1 is a block diagram of a digital still camera according to one aspect of the present invention.

Referring now in more detail to the drawings in which like numerals refer to like parts throughout several views, shown in FIG. 1 is a block diagram of a digital still camera 100 according to one aspect of the present invention. A digital camera comprises two or more optical lenses 102 and 142 with an autofocus/shutter, drivers and actuators 104 and associated photometry interface and processing 110 such as autofocus, auto shutter and contrast control. A pair of imagers 106 and 124 such as a CCD or equivalent converts an image projected through optical lenses 102 and to a series of pixels 106. Regulators and image drivers 108 allow regulation of the imager 106. An audio acquisition device 112, such as a microphone, along with audio processing circuitry 114, allows a user to make aural recordings along with digital images. A battery 118 with power management converter and control circuitry 114 allows the camera 100 to work as a portable device. A picture processor 120, provides pixel information to one or more frame buffers 122 coupled to picture stitching device 120 which is described further below. In this embodiment, the picture stitching device 120 is implemented as an ASIC. A set of LCD displays 126 and 144 or equivalent enables a user to view the two images projected through lenses 102 and 142 into imagers 106 and 124. The imagers 106 and 124 are controlled by LCD controller and drivers 128 and provide a stereoscopic image to a user's left and right eye. A PAL/NTSC 130 encoder provides an interface to other display types. An image CODEC 132 coupled to picture processor 120 provides known image enhancement effects for the picture processor 120. A DSP 134 such a STMicroelectronics ST-20/SH3-DSP is used to control the memory interface and the data I/O 136 such at Infra-Red, Universal Serial Bus or other interfaces. A DRAM 138 provides execution memory for the DSP 134 to perform Image Stitching algorithms as described below. An audio output 140 such as a speaker provides the user aurally playback. All of these components are representative components of the digital camera 100. Storage media 144 such as Flash memory, diskettes or removable hard drives store each image and associated audio. In one embodiment, the algorithms carrying out the steps for image as also stored on the storage media 146. The stereoscopic images described below are stored on the storage media 144 along with captured images and audio. Processing for the images may occur prior to or after the image is stored in storage media 144. The general operation of a digital camera comprising most elements described herein is well understood by those skilled in the art.

One or more user inputs via the LCD Controller 128 provides user control over camera functions such as different modes to acquire pictures:

1. Stereoscopic picture acquisition mode—the system 100 acquires two pictures related to the left and right eye to produce a stereoscopy image.
2. Single picture acquisition mode—the system 100 acquires one picture only.
3. Movie mode—the system 100 displays a preview of the image in single picture mode or to display a preview of two images in the stereoscopic picture acquisition mode through the viewfinders.
4. Play-back mode—the system 100 displays the image through viewfinders after acquisition.

The system 100 acquires two pictures related to the left and right eye through system 100. Two pictures are displayed through the two electronic viewfinders. The user perceives them as a stereoscopic scene. The images acquired can be saved either as two independent images using well-known standards and file formats (for ex: JPEG, TIF, GIF) or as a single stereoscopic picture using proprietary compression algorithms and/or file formats or anaglyphs.

Exemplary Embodiment of Stereoscopic Camera with an Embedded Standard Cell

Figure 2:
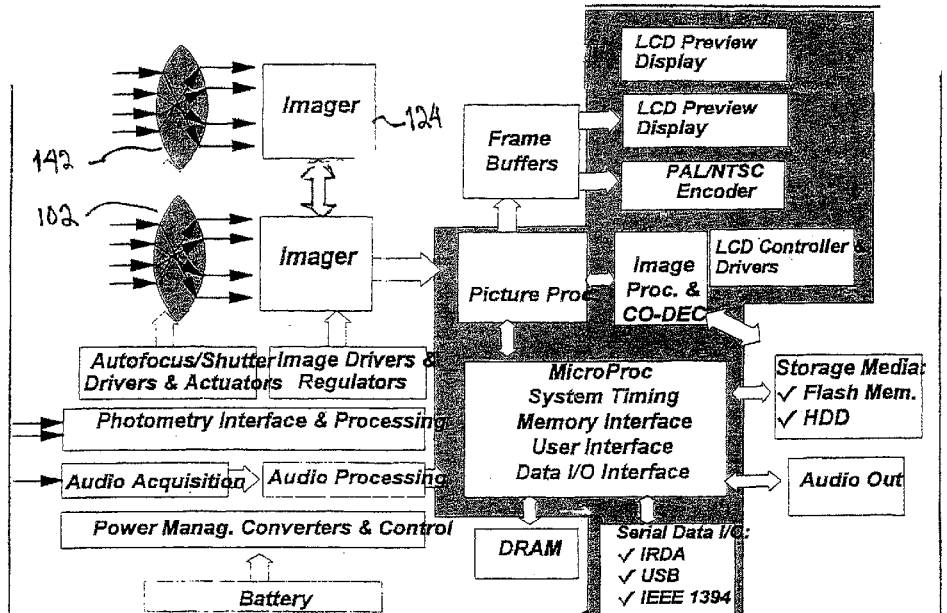
FIG. 2 is a block diagram of the digital still camera of FIG. 1 in another embodiment integrated as a standard cell in a semi-custom semiconductor device, according to the present invention.

In another embodiment, many of the components of FIG. 1 are embedded in as part of a standard cell in a semi-custom semiconductor device. FIG. 2 is a block diagram 200 of the picture-stitching device of FIG. 1 in another embodiment integrated as a standard cell in a semi-custom semiconductor device, according to the present invention. In this embodiment, the picture processor 120, the DSP or microprocessor 134, serial data I/O 136, image CODEC 132, LCD preview and display 126, PAL/NTSC encoder 130 and LCD controller & drivers 128 are all integrated as one device 200. To those skilled in the art, it will be obvious to substitute and modify this exemplary single device 200 to include the DSP or microprocessor 134 with other circuitry as well.

Exemplary Embodiment of Stereoscopic Camera of FIG. 1 Simplified

Figure 3:
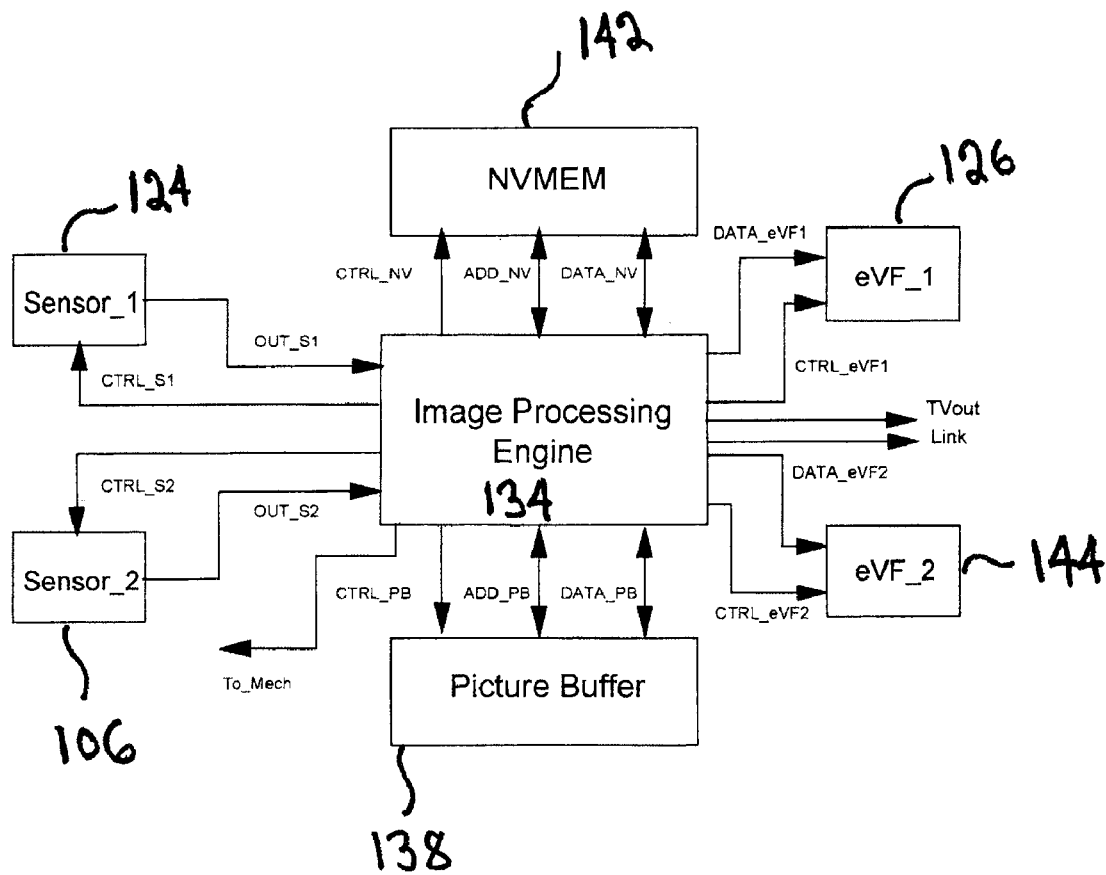
FIG. 3 is a block diagram of the digital still camera of FIG. 1, with the main elements shown for simplification, according to the present invention.

FIG. 3 is a block diagram 300 of the digital still camera of FIG. 1 with the main elements shown for simplification, according to the present invention. Shown are two imager sensors 124 and 106 feeding into the DSP or microprocessor 134. Each of the imager sensors 124 and 106 comprise a built-in analog to digital converter.

Figure 4:
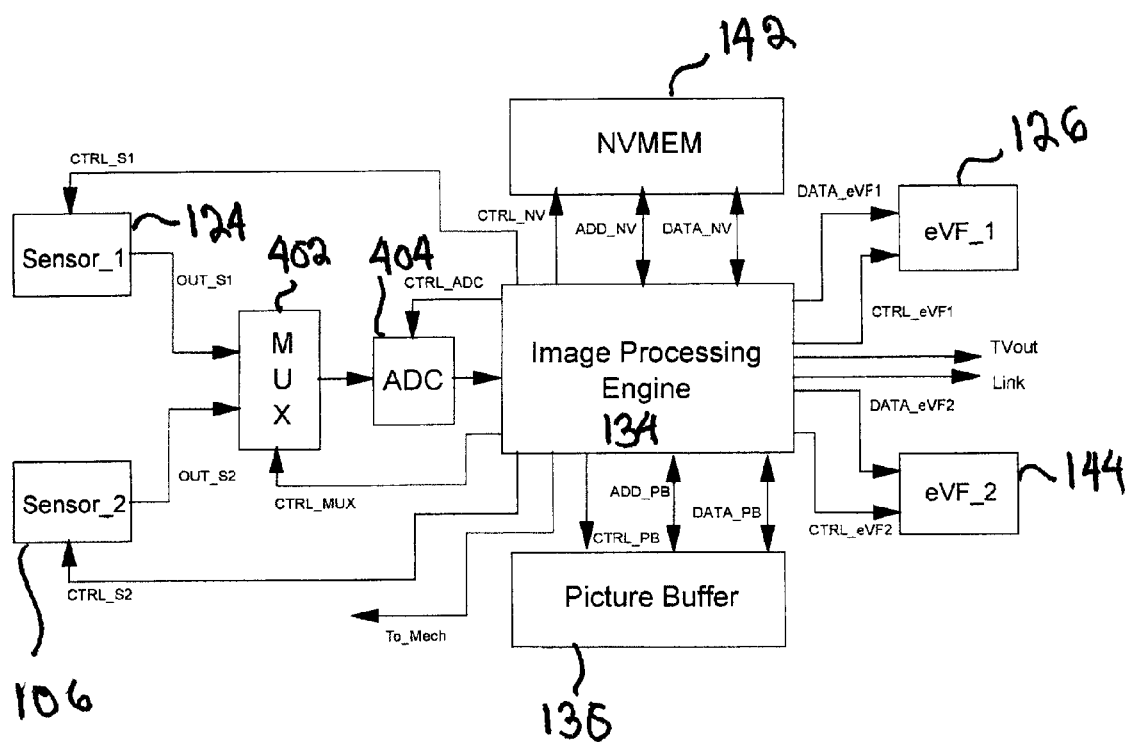
FIG. 4 is a block diagram of the digital still camera of FIG. 3, where the imager sensor does not have embedded A/D capabilities, according to the present invention.

In an alternate embodiment, the imager sensors do not have built-in analog to digital converters. This is shown in FIG. 4. The signals from each imager sensor 124 and 106 are fed into a multiplexer 402, then into a single analog to digital converter 404 for processing by DSP 134.

Exemplary Embodiment of Picture Processor of FIG. 1

Figure 5:
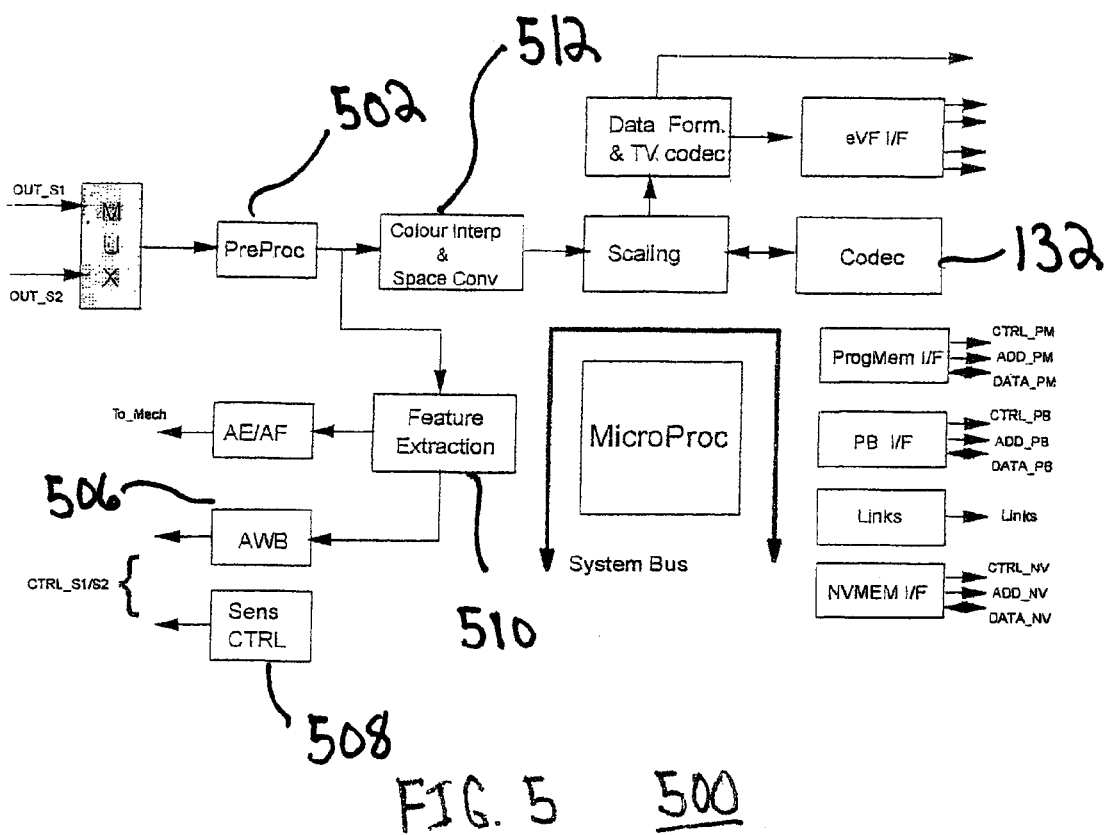
FIG. 5 is a block diagram of the major components of the picture processor of FIG. 1, according to the present invention.

FIG. 5 is a block diagram 500 of the major components of the picture processor of FIG. 1, according to the present invention. A preprocessor module 502 is used for signal equalization, gamma correction, and offset correction. An AE/AF module is autoexposure and autofocus interface to autofocus system 104. An AWB module 506 provides autowhite balance. A sense CTRL sensor module 508 controls signal generation. A Feature extraction module 510, extracts the image parameters required to implement AE/AF/AWB. A color interpolation and space converter module 512, the sensor generally provides only one color component per pixel. The color interpolation and space converter module 512 interpolate the missing information in order to have the full 3 color components for each pixel. Moreover, if a color space different that RGB (Red, Green, and Blue) is required, this color interpolation and space converter module 512 implements all the operations required to obtain the image representation according to the selected space. The scaling module 514 implements all the operations required to change the image dimensions and to correct the "window effect" of cropping when the stereoscopic picture is displayed as an anaglyph through the monitor such as a computer display or TV. The CODEC 132, implements the required data formatting for the electronic viewfinders and the TV signal in either analog or digital or both. The CODEC 132 can use both proprietary and/or standard encoding methods.

Exemplary Embodiment Of Anaglyph Image Creation

Figure 6:
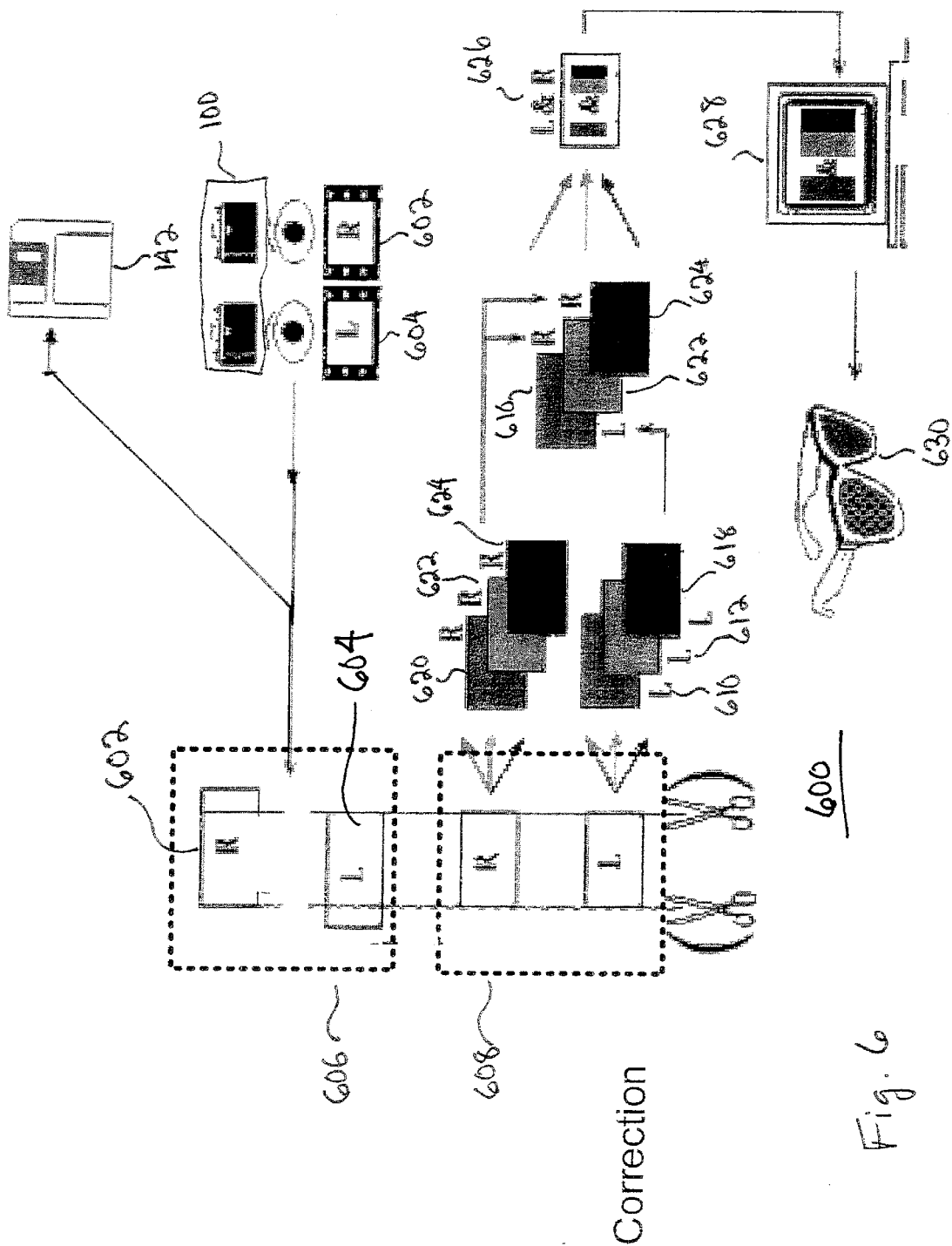
FIG. 6 is a block diagram of two images being cropped and color combined to form a third image, which is the anaglyph, according to the present invention.

FIG. 6 is a block diagram 600 of two images being cropped and color combined to form a third image, which is the anaglyph, according to the present invention. In one embodiment, two pictures 602 (right) and 604 (left) are captured using the system 100. In another embodiment, the two pictures are previously stored on storage media 142.

Both the right image 602 and the left image 604, are composed of three color channels RGB (Red Green Blue). Each of the right image 602 and the left image 604 are cropped. The exact geometric equation for cropping is explained in FIG. 7 below.

Once each of the right image 602 and the left image 604 are cropped, the color channels are mixed. After the cropping operation, each image still has three color channels RGB. The left image has a red color channel 610, a green color channel 612 and a blue color channel 618. The right image has three color channels: red color channel 620, green color channel 622 and blue color channel 624. The anaglyph 626 is formed by combining the left red channel 610 with the right green and blue channels, 622 and 624. Note, other combinations of left channel and right channel are possible to accomplish the blending of three orthogonal color channels into one image and these combinations are within the true scope and spirit of the present invention. The anaglyph can then be viewed on display 628 with 3-D filter glasses 630.

In another embodiment, once the anaglyph is formed, it is scaled to a desirable target size (not shown). The scaling preformed uses techniques known in the art such as averaging or binary interpolation.

Exemplary Geometric Cropping

Figure 7:
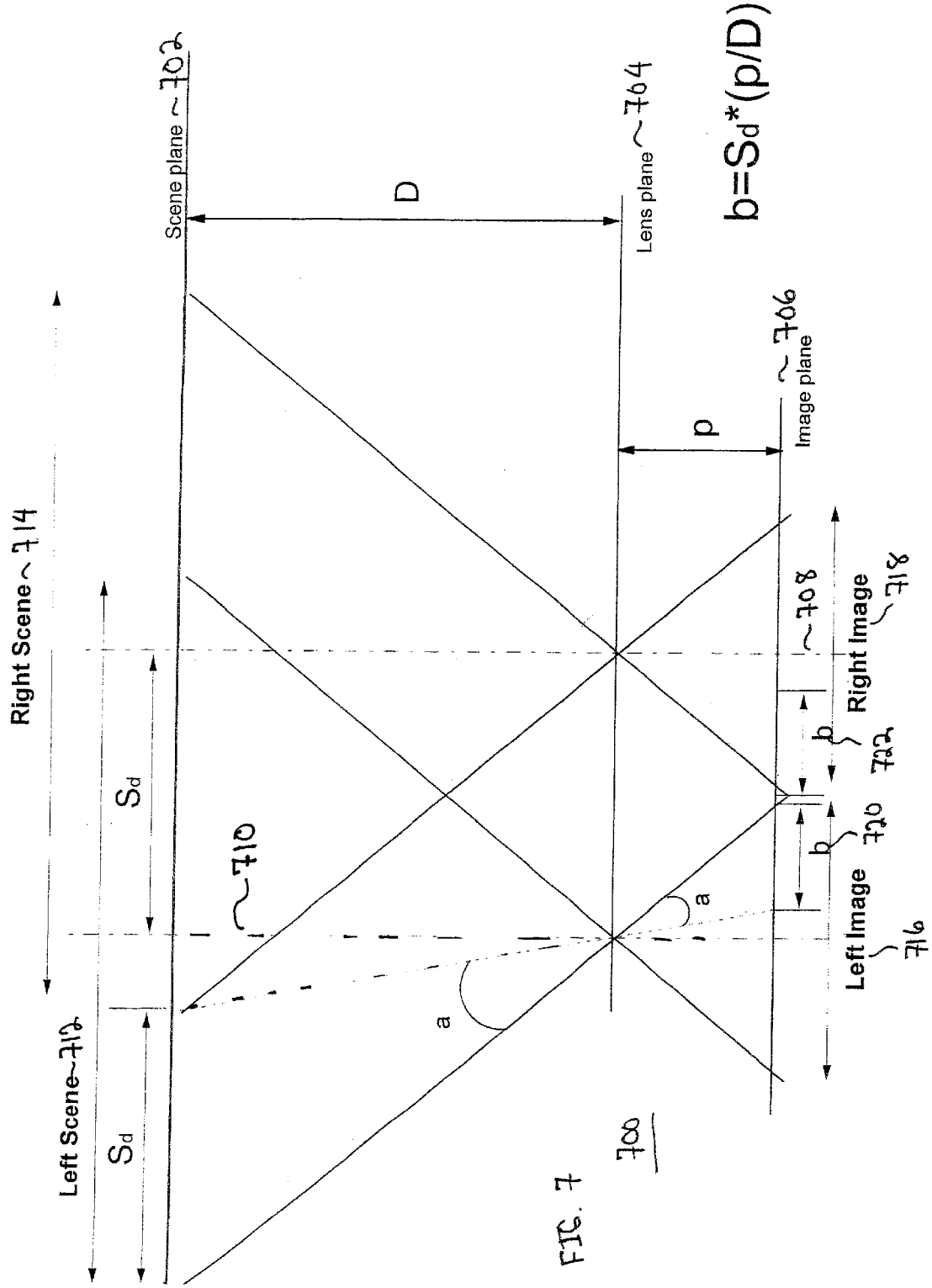
FIG. 7 is a block diagram of the geometric cropping calculation of the two images during the creation of and anaglyph of FIG. 6, according to the present invention.

FIG. 7 is a block diagram 700 of the geometric cropping calculation of the two images during the creation of and anaglyph of FIG. 6, according to the present invention. A scene plane 702 is the plane parallel to the lens plane of lenses 102 and 142 of system 100, in which the subject of the image lies. The lens plane 704 is the plane parallel to the lens plane in which the film (for a film-based camera) or the imagers 106 and 124 lie. Lines 708 and 710 are normal to each of the image plane 706, the lens plane 704 and the scene plane 702. A left scene 712 and right scene 714 are captured at a stereoscopic distance $S_d$. The $S_d$ is set to an approximate value equal to the separation between human eyes of approximately 60–70 millimeters. The left scene 712 and right scene 714, through lenses 102 and 142 are projected onto image plane 706 as left image 716 and right image 718. A region 720 is cropped out or thrown away from the left image 716. Similarly, a region 722 is cropped out from the right image 718. The width (b) of the regions 720 and 722 are defined as follows:

$$b=S_d*(p/D)$$

where $S_d$ is the stereoscopic distance;
p is the distance between the image plane 706 and the lens plane 704
D is the distance between the lens plane 704 and the scene plane 702.

It is important to note that both p and D can be obtained from the system 100 when an autofocus lens system 104 is used.

In another embodiment, where an autofocus lens system 104 is not used, but rather a fixed lens system is used, p is fixed per lens and D is assumed. For example, D would be a large number (10 meters or more) for far shots such as landscape or a small number, such as (0.1 meters to 0.5 meters) for macro focused shots of plants and sea-life.

In yet another embodiment, a menu is presented to the user of system 100 through LCD displays 126 and 144 to select the distance. For example, the menu may by 0.1 to 0.5 meters, 0.5 to 3 meters, and 3 meters and above. The user can quickly estimate the distance. It should be noted that other distances can be used in the menu example which are within the true scope and spirit of the present invention.

Figure 8:
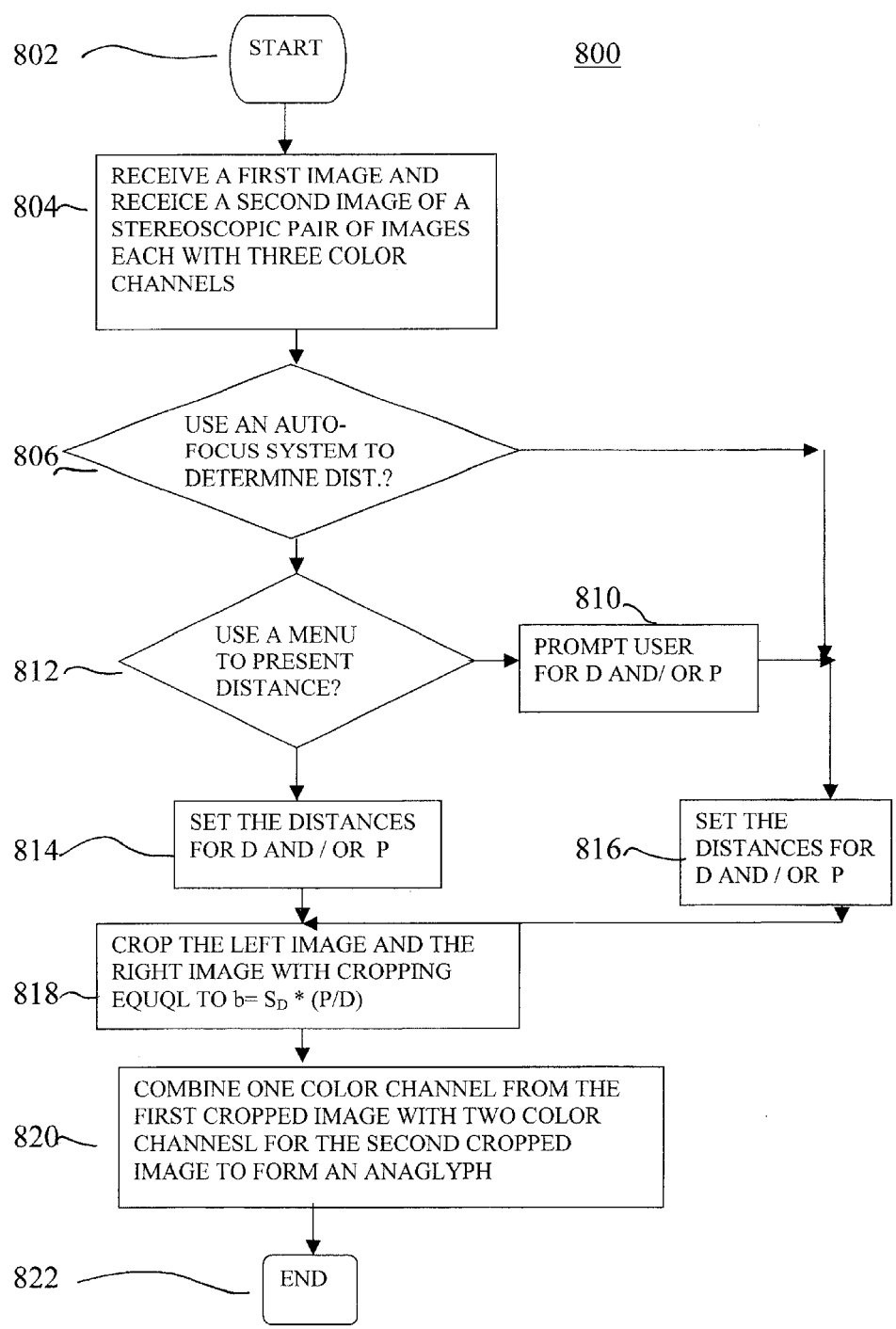
FIG. 8 is a flow diagram of two images being cropped and color combined to form a third image, which is the anaglyph of FIG. 6, according to the present invention.

The process flow 800 of FIG. 6 is shown in the flow diagram of FIG. 8. The process begins with step 802 and the first image and the second image of a stereoscopic where each image has three color channels 804. If the system 806 has autofocus circuitry 104. The auto-focus circuitry after determining a distance D from the subject to the lens plane 704 (of lenses 142 and 102) is set for D and or P in steps 806 and 816.

In the embodiment where autofocus circuitry 104 is not included or being used, a menu of possible distances from the lens plane 704 is shown as described above in steps 806 through 816. The distance D is then set from the user selection, in step 816.

In another embodiment, the distance D is fixed an set as a parameter for system 100 in step 718.

Once the D and or P is set, the cropping of the first image and the second image is done as explained above in FIG. 7, step 720.

Finally, once the first image and the second image are cropped, one of the three color pairs, such as red, is combined with two of the colors from the second image, such as green and blue, to form the analgyph, step 822. The anaglyphs is then ready for display.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A digital stereo camera for creating anaglyphs of a given subject with a pre-set stereoscopic distance ($S_d$); a pre-set distance (D) between an scene plane and a lens plane defined by pair of first and second lenses aligned on along a plane; and a pre-set distance (p) between the lens plane and an image plane of the camera, the digital camera comprising:

a first lens of a lens pair coupled with a first imager for receiving a first image of a subject, the first imager producing a digital three color channel representation of the first image received;

a second lens of the lens pair coupled with a second imager for receiving a second image of the subject, the second imager producing a digital three color channel representation of the second image received;

an image processing engine for cropping the first and for cropping the second image each an amount (b), where $b=S_d*(p/D)$; and a color interpolator for combining one color channel of the three color channel from the first image with two color channels of the three color channel from the second image, so that the resulting image comprises three orthogonal color channels.

2. The digital camera for creating anaglyphs, according to claim 1, wherein the three color channels is a red color channel, a green color channel and a blue color channel.

3. The digital camera for creating anaglyphs, according to claim 2, wherein the color interpolator combines a red channel from the first image with a blue channel and a green channel from the second image.

4. The digital camera for creating anaglyphs according to claim 3, wherein the first image is a left hand image and the second image is right hand image of a stereoscopic pair of images.

5. The digital camera for creating anaglyphs, according to claim 1, further comprising:

a multiplexer with a first input for receiving the first image and a second input for receiving the second image and an output for selectively presenting either the first input and the second input thereon;

an analog to digital converter coupled to output of the multiplexer for converting the first image received and the second image received into a digital three color channel representation.

6. The digital camera for creating anaglyphs, according to claim 1, further comprise, an interface to a computer readable medium containing digital three color channel representation of the first image and the second image.

7. The digital camera for creating anaglyphs, according to claim 1, further comprising:

an auto-focus driver for adapting the focus of the lens to a distance from the subject; and means for changing the preset distance between the subject and the lens based upon a distance set by the auto-focus driver for cropping the first image and for cropping the second image.

8. The digital camera for creating anaglyphs, according to claim 1, further comprising:

means for changing the pre-set distance between the lens and the image plane based upon a distance set by an auto-focus driver for cropping the first image and for cropping the second image.

9. The digital camera for creating anaglyphs, according to claim 1, further comprising:

input for receiving a user's estimation of the distance from the lens to the subject; and means for changing the pre-set distance between the subject and the lens based upon the user input received.

10. The digital camera for creating anaglyphs according to claim 9, further comprising:

a display; and means for generating a menu of distances from the lens to the subject on the display.

11. The digital camera for creating anaglyphs, according to claim 1, further comprising:

an auto-focus circuit for setting a focal distance between the lens pair and the subject; and wherein the pre-set distance (D) is set to a distance determined by the auto-focus circuit.

12. This digital camera for creating anaglyphs, according to claim 1, wherein the pre-set distance (p) is set to a distance determined by an auto-focus circuit.

13. A method in digital stereo camera for creating anaglyphs of a given subject with a pre-set stereoscopic distance ($S_d$); a pre-set distance (D) between an scene plane and a lens plane defined by pair of first and second lenses align on along a plane; and a pre-set distance (p) between the lens plane and an image plane of the camera, the camera having a pair of imagers coupled to the pair of lenses, the method comprising the steps of:

producing a pair of stereo images each having three color channels;

cropping each of the pair of images by an amount (b), where $b=S_d*(p/D)$; and combining one color channel from one of the pair of stereo images image with two color channels from a second of the pair of stereo images, so that the resulting image comprises three orthogonal color channels.

14. The method according to claim 13, wherein the step of cropping further includes cropping each pair of images by an amount (b) where a pre-set distance (D) is set to a distance determined by the auto-focus circuit coupled to the camera.

15. The method according to claim 14, wherein the stop of cropping further includes cropping each pair of images by an amount (b) where the pre-set distance (p) is set to a distance determined by the auto-focus circuit coupled to the camera.

16. A computer readable medium containing programming instructions in digital stereo camera for creating anaglyphs of a given subject with a pre-set stereoscopic distance ($S_d$); a pre-set distance (D) between an scene plane and a lens plane defined by pair of first and second lenses aligned on along a plane; and a pre-set distance (p) between the lens plane and an image plane of the camera, the camera having a pair of imagers coupled to the pair of lenses, the programming instructions comprising of:

producing a pair of stereo images each having three color channels; a cropping each of the pair of images by an amount (b), where $b=S_d*(p/D)$; and combining one color channel from one of the pair of stereo images image with two color channels from a second of the pair of stereo images, so that the resulting image comprises three orthogonal color channels.

17. The computer readable medium of claim 16, wherein the instruction of cropping further includes cropping each pair of images by an amount (b) where the pre-set distance (D) is set to a distance determined by the auto-focus circuit coupled to the camera.

18. The method according to claim 17, wherein the instruction of cropping further includes cropping each pair of images by an amount (b) where the pre-set distance (p) is set to a distance determined by the auto-focus circuit coupled to the camera.

* * * * *